United States Patent
Dash et al.

(10) Patent No.: US 9,749,941 B2
(45) Date of Patent: Aug. 29, 2017

(54) DEVICE AND METHOD FOR RADIO ACCESS TECHNOLOGY SEARCH

(71) Applicant: Intel IP Corporation, Santa Clara, CA (US)

(72) Inventors: Deepak Dash, Khordha (IN); Vijay Katakam, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/964,600

(22) Filed: Dec. 10, 2015

(65) Prior Publication Data

US 2017/0171799 A1    Jun. 15, 2017

(51) Int. Cl.
| | |
|---|---|
| *H04W 48/16* | (2009.01) |
| *H04W 72/04* | (2009.01) |
| *H04W 56/00* | (2009.01) |
| *H04W 24/02* | (2009.01) |
| *H04W 24/10* | (2009.01) |

(52) U.S. Cl.
CPC ........... *H04W 48/16* (2013.01); *H04W 24/02* (2013.01); *H04W 24/10* (2013.01); *H04W 56/001* (2013.01); *H04W 72/0453* (2013.01)

(58) Field of Classification Search
CPC .................................................... H04W 48/16
USPC ......................................................... 455/434
See application file for complete search history.

(56) References Cited

U.S. PATENT DOCUMENTS

| | | | |
|---|---|---|---|
| 2003/0236079 A1* | 12/2003 | Hasegawa ............ | H04B 1/7083 455/160.1 |
| 2004/0219915 A1* | 11/2004 | Bamburak ............ | H04W 48/18 455/435.2 |
| 2009/0010319 A1* | 1/2009 | Sun ......................... | H04L 5/006 375/224 |
| 2009/0130985 A1* | 5/2009 | Lee ...................... | H04L 27/2608 455/67.11 |
| 2009/0268711 A1* | 10/2009 | Ventola ............... | H04L 27/0012 370/350 |
| 2010/0091674 A1* | 4/2010 | Sjogren ................. | H04W 48/16 370/252 |
| 2012/0120999 A1* | 5/2012 | Kubo ................... | H04W 24/10 375/224 |
| 2012/0252446 A1 | 10/2012 | Reial et al. | |

(Continued)

FOREIGN PATENT DOCUMENTS

| | | |
|---|---|---|
| GB | 2409606 A | 6/2005 |
| WO | 2009039211 A1 | 3/2009 |

OTHER PUBLICATIONS

European Search Report based on application No. EP 16 19 6612 (11 pages) dated Apr. 7, 2017 (Reference Purpose Only).

*Primary Examiner* — Christopher M Brandt
(74) *Attorney, Agent, or Firm* — Viering, Jentschura & Partner mbB

(57) ABSTRACT

A device and a method to search a public landline mobile network for a radio access technology network, consisting of scanning a frequency band, wherein the signal strengths for the frequencies in the frequency band are measured, and performing an analysis of the signal strengths for various sets of frequencies within the frequency band in order to differentiate between different radio access technology networks based on the uniformity of the signal strengths of the frequencies in their respective operating bandwidths within the frequency band.

24 Claims, 8 Drawing Sheets

(56) References Cited

U.S. PATENT DOCUMENTS

| | | | | |
|---|---|---|---|---|
| 2014/0066061 A1* | 3/2014 | Lou | ............... | H04W 48/16 455/434 |
| 2015/0341846 A1* | 11/2015 | Shi | ............... | H04W 48/16 455/434 |
| 2016/0073417 A1* | 3/2016 | Sebeni | ............... | H04W 48/16 370/329 |

\* cited by examiner

DEVICE AND METHOD FOR RADIO ACCESS TECHNOLOGY SEARCH

TECHNICAL FIELD

Various embodiments relate generally to a device and method for searching the public land mobile network for radio access technologies.

BACKGROUND

During a public land mobile network (PLMN) search, a multi-radio access technology (multi-RAT) user equipment searches all of the RATs, e.g., Global System for Mobile Communications (GSM), Universal Mobile Telecommunications System (UMTS), and Long-Term Evolution (LTE), etc. Based on different search conditions and algorithms, the user equipment (UE) searches cells in a different RAT order. In the situation where two or more RATs share a common frequency band, a UE may attempt to synchronize with the incorrect RAT, thereby resulting in a delay in synchronizing with the correct RAT.

For example, the UE may search for a GSM RAT prior to searching for an LTE RAT. In the existing Third Generation partnership Project (3GPP) configuration, there is a common frequency band for GSM and LTE. The actual frequency band allocation of LTE and GSM within the common frequency band may vary from country to country. Since GSM and LTE operate on a common frequency band, there is a high possibility that a UE searching for GSM cells may detect LTE cells and try to synchronize with the LTE cell. In the event that the cell is not a GSM cell, the UE has wasted time synchronizing with an undesired RAT cell. As a result, the search time to synchronize with the desired RAT, in this example GSM, is lengthened.

Therefore, there remains a need in order to improve the RAT search time for a UE where there are two or more RATs on a common frequency band.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
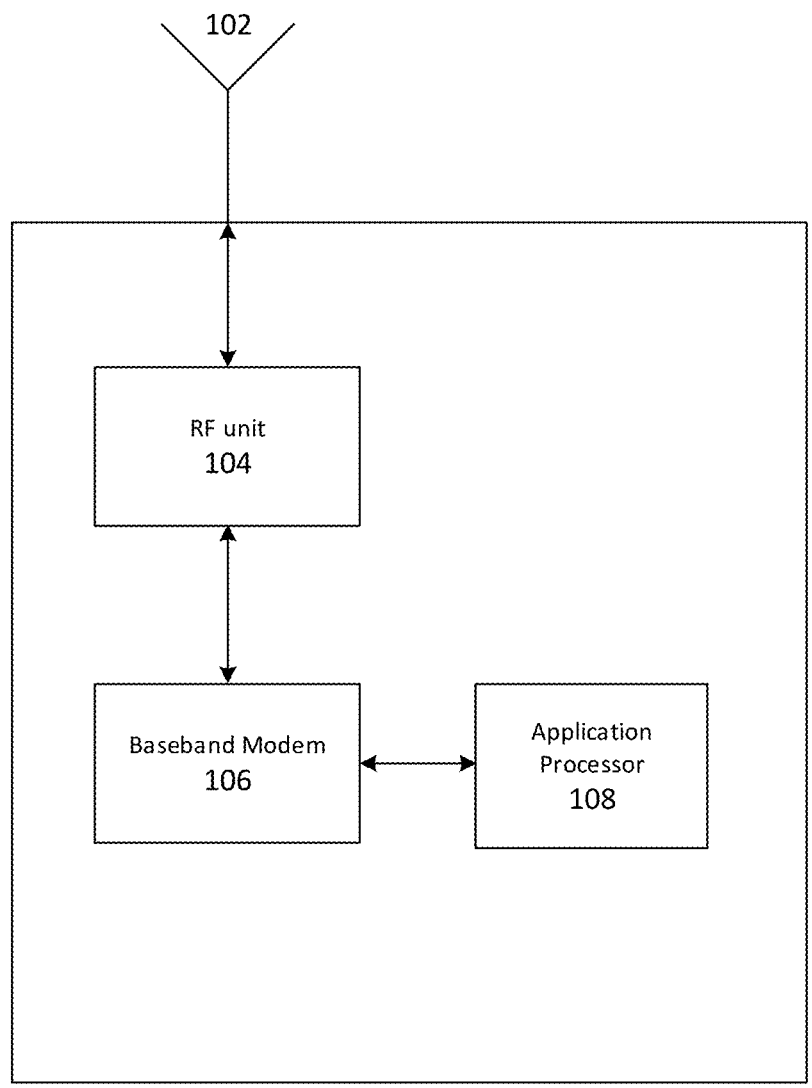
FIG. 1 shows an example of a mobile terminal in an aspect of this disclosure.

The following details description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The terms "mobile terminal" and "user equipment" (UE) may be used interchangeably. These terms may refer to any kind of radio communication device, such as a cell phone, tablet, personal digital assistant, labtop computer, notebook computer, portable music player, smartwatch or the like.

As used herein, a "circuit" may be understood as any kind of a logic implementing entity, which may be special purpose circuitry or a processor executing software stored in a memory, firmware, and any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, e.g., any kind of computer program, for example, a computer program using a virtual machine code, e.g., Java. Any other kind of implementation of the respective functions which will be described in more detail below may also be understood as a "circuit". It may also be understood that any two (or more) of the described circuits may be combined into one circuit.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" with which a mobile terminal is currently connected in accordance with the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of the mobile communications device under 3GPP (Third Generation Partnership Project) specifications, notably Long Term Evolution (LTE) and Long Term Evolution-Advanced (LTE-A). Other mobile radio communications systems, however, may be used, where applicable. The examples provided herein can apply to other existing, or other not yet formulated standards, so long as they share the underlying features disclosed in the following examples.

FIG. 1 shows a schematic diagram of a mobile terminal 100 according to one aspect of this disclosure. Mobile terminal 100 is configured to search a frequency band supporting more than one RAT from which a selected RAT can be detected by signal patterns.

As shown in FIG. 1, mobile terminal 100 may include an antenna 102, radio frequency (RF) unit 104 (i.e. RF transceiver), baseband modem 106, and application processor 108. As shown in FIG. 1, these components may be implemented as separate components. However, as depicted in FIG. 1, it is appreciated that the configuration of mobile terminal 100 is for purposes of explanation, and accordingly, one or more of the aforementioned components of mobile terminal 100 may be integrated into a single equivalent component or divided into multiple components with collective equivalence. It is also appreciated that mobile terminal 100 may have one or more additional components, such as hardware, software, or firmware elements. For example, mobile terminal 100 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. For example, mobile terminal 100 may also include a variety of user input/output devices, such as display(s), keypad(s), touchscreen(s), speaker(s), microphone(s), button(s), camera(s), etc.

In an overview of the operation of mobile terminal 100, mobile terminal 100 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of mobile terminal 100 may be shared between different wireless access protocols, such as, for example, by sharing an antenna 102 between multiple different wireless access protocols or RATs. In an exemplary aspect of this disclosure, RF unit 104 and/or baseband modem 106 may operate according to multiple communication access protocols (i.e. "multi-mode"), and thus may be configured to support one or more of LTE, GSM, and/or UMTS access protocols.

Furthermore, RF unit 104 may receive frequency wireless signals via antenna 102, which may be implemented as, for example, a single antenna or an antenna array composed of multiple antennas. RF unit 104 may include various reception circuitry elements, for example, analog circuitry configured to process externally received signals, such as circuitry to convert externally received RF signals to baseband and/or intermediate frequencies. RF unit 104 may also include amplification circuitry to amplify externally received signals, such power amplifiers and/or Low Noise Amplifies, although it is appreciated that such components may also implemented separately. RF unit 104 may additionally include various transmission circuit elements configured to transmit signals, such as, for example, baseband and/or intermediate frequency signals provided by the baseband modem 106, which may include mixing circuitry to modulate signals onto one or more radio frequency carrier waves and/or amplification circuitry to amplify internal signals before transmission. The RF unit 104 may provide such signals to antenna 102 for wireless transmission. Although not explicitly depicted in FIG. 1, RF unit 104 may be additionally connected to application processor 108.

Baseband modem 106 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 106 and may also be partially or fully integrated with the digital processing circuitry.

The baseband modem 106 may be configured to operate one or more protocol stacks, such as a GSM protocol stack, an LTE protocol stack, a UMTS protocol stack, etc. or any combination thereof. Baseband modem 106 may be multi-mode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 106 may be configured to control one or more further components of mobile terminal 100. The protocol stack(s) of baseband modem 106 may be configured to control operation of the baseband modem 106, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

In a first exemplary aspect of the disclosure, the baseband modem may be configured to trigger a scan of a frequency band and conduct the scan of the frequency band, wherein a signal strength for all of the frequencies (or, at least, a plurality of frequencies) in the frequency band is measured. The baseband modem may be further configured to perform an analysis of signal strengths for a specific set (or window) of frequencies within the frequency band, wherein the mean and the standard deviation of the signal strengths for each frequency in the specific set of frequencies are calculated and compared to a predetermined threshold value. In this aspect of the disclosure, the baseband modem may be configured to synchronize with a RAT with a substantially non-uniform signal strength across its frequency spectrum, e.g. GSM. If the standard deviation of the signal strengths of the set of frequencies calculated by the baseband modem is lower than the predetermined standard deviation threshold value, the frequencies in the window are not considered for RAT synchronization. In other words, in the context when the searching RAT (GSM in this example) characteristic falls below the standard deviation value, the frequencies will not be considered. If the standard deviation of the signal strengths of the set of frequencies calculated by the baseband modem is higher than the predetermined threshold value, the frequencies in the window may be marked for RAT (in this example, GSM) synchronization. This is attributed to the fact that since the standard deviation of the frequencies exceeds the threshold value, the frequencies are seen to have a substantially non-uniform signal strength across its spectrum, which is a characteristic of GSM. Thereafter, the baseband modem may be further configured to repeat the analysis of signal strengths for other sets of frequencies within the frequency band. The baseband modem may repeat this analysis on different sets, i.e. windows, of the frequency band until all the frequencies of the frequency band have been analyzed.

The above scenario may be employed when the mobile terminal is attempting to connect to a RAT which exhibits a substantially non-uniform signal strength across a spectrum of frequencies, such as, for example, GSM.

In a second exemplary aspect of the disclosure, the baseband modem may be configured to trigger a scan of a frequency band and conduct the scan of the frequency band, wherein a signal strength for all of the frequencies (or, at least, a plurality of frequencies) in the frequency band is measured. The baseband modem may be further configured to perform an analysis of signal strengths for a specific set (or window) of frequencies within the frequency band, wherein the mean and the standard deviation of the signal strengths for each frequency in the specific set of frequencies is calculated and compared to a predetermined threshold value. In this aspect of the disclosure, the baseband modem may be configured to synchronize with a RAT with a substantially uniform signal strength across its frequency spectrum, e.g. LTE. If the standard deviation of the signal strengths of the set of frequencies calculated by the baseband modem is higher than the predetermined threshold value, the frequencies in the window are not considered for RAT synchronization. In other words, in the context when the searching RAT (in this example, LTE) characteristic falls above the standard deviation value, the frequencies will not be considered. If the standard deviation of the signal strengths of the set of frequencies calculated by the baseband modem is lower than the predetermined threshold value, the frequencies in the window may be marked for RAT (in this example, LTE) synchronization. This is attributed to the fact that since the standard deviation of the frequencies does not exceed the threshold value, the frequencies are seen to have a substantially uniform signal strength across its spectrum, which is a characteristic of LTE. Thereafter, the baseband modem may be further configured to repeat the analysis of signal strengths for other sets (or windows) of frequencies within the frequency band. The baseband modem may repeat this analysis on different sets, i.e. windows, of the frequency band until all the frequencies of the frequency band have been analyzed.

The above scenario may be employed when the mobile terminal is attempting to connect to a RAT which exhibits a substantially uniform signal strength across a spectrum of frequencies, such as, for example, LTE or UMTS.

The application processor 108 may be implemented as a Central Processing Unit (CPU), and may function as a controller of mobile terminal 100. The application processor 108 may be configured to execute various applications and/or programs of mobile terminal 100, such as, for example, applications corresponding to program code stored in a memory component of mobile terminal 100 (not shown in FIG. 1). The application processor 108 may also be configured to control one or more further components of mobile terminal 100, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 106 and application processor 108 are depicted separately in FIG. 1, it is appreciated that the figure is not limiting in nature. It is understood that the baseband modem 106 and the application processor 108 may be implemented separately, implemented together (i.e. as an integrated unit), partially implemented together, etc.

Figure 2:
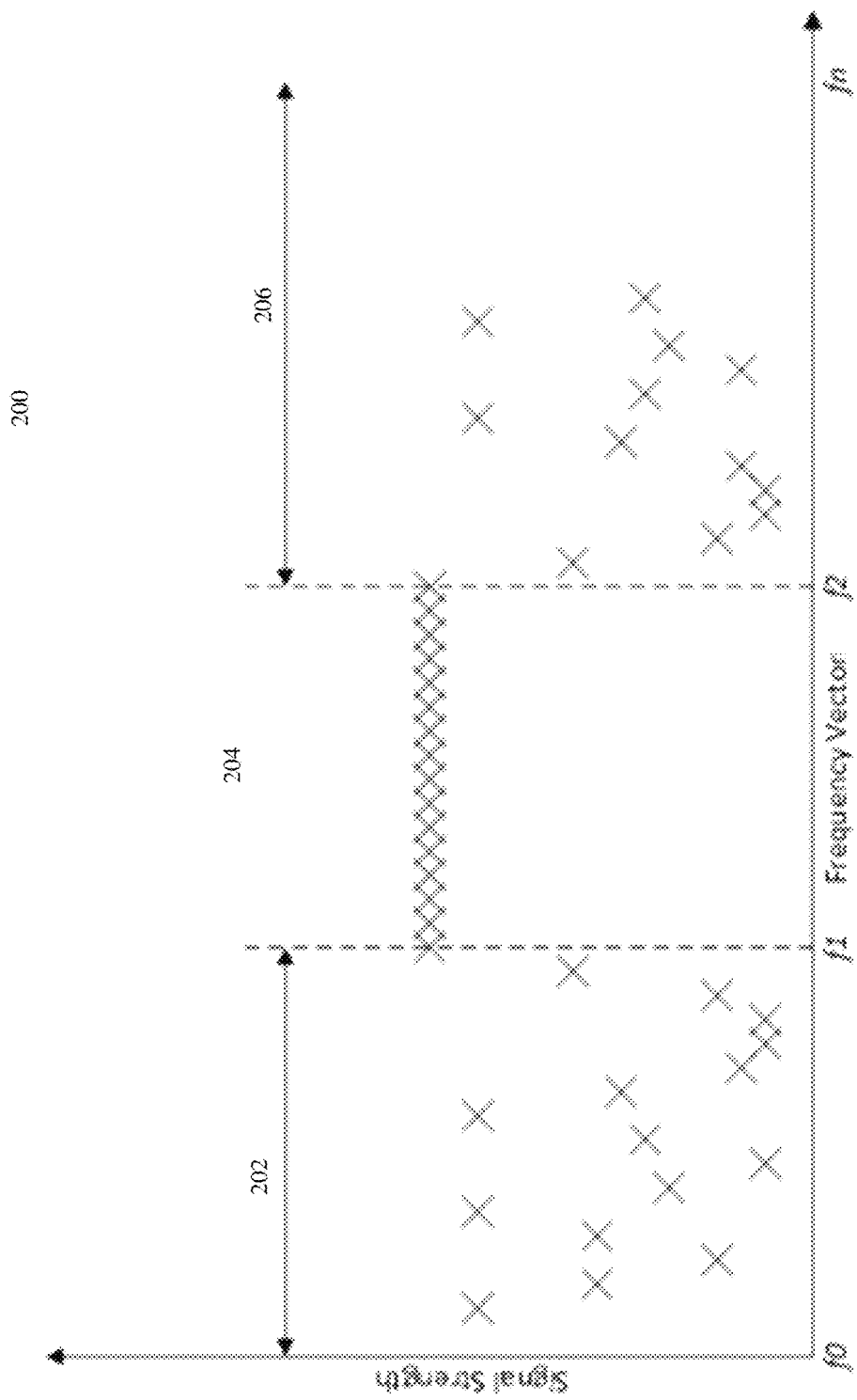
FIG. 2 shows a graph of frequency vs. signal strength in an aspect of this disclosure

FIG. 2 shows a graph 200 of frequency vs. signal strength in an aspect of this disclosure. After conducting the scan of the frequency band, here shown as being from $f_0$ to $f_n$, the resulting data (frequencies and signal strengths) is analyzed by the baseband modem. For purposes of this example, an exemplary set of data obtained in a frequency band scan has been mapped onto a graph 200 in order to more clearly demonstrate the inventive aspect of this disclosure. However, the set of data may be organized in a table, list, chart, or the like. The frequency band is plotted along the x-axis and the signal strength, or signal power, is plotted along the y-axis.

The data exhibited in graph 200 is an example of data which would typically be collected from scan of a frequency band in which GSM and LTE have been allocated on a common frequency band, for example, on the 850 MHz, 900 MHz, 1800 MHz, or the 1900 MHz frequency band. It can be appreciated by one skilled in the art that these frequency bands operate in frequencies around their respective frequency. For example, the 1900 MHz band operates in a range of frequencies around 1900 MHz, such as from 1850.2 MHz to 1989.8 MHz.

In this example, GSM and LTE will be the two RATs discussed, but it should be appreciated that other RATs may be subject to the following disclosure as well. For instance, the following disclosure may also be applied to a common frequency band supporting GSM and UMTS.

Each "X" is an exemplary data point with a frequency as the x-value and the frequency's corresponding signal strength as the y-value. As can be seen in FIG. 2, the frequency ranges from $f_0$ to $f_1$ (202) and $f_2$ to $f_n$ (206) exhibit substantially non-uniform signal strengths within their respective frequency ranges. This is distinct from the frequency range from $f_1$ to $f_2$ (204) shown between the dotted lines in the shaded region of the graph 200. Here, the signal strengths are substantially uniform within the frequency range.

Ranges 202 and 206 are typical of what a GSM operating bandwidth would look like. As can be seen, the signal strengths of the frequencies within the GSM operating bandwidth are substantially non-uniform. In other words, the signal strengths vary greatly within the GSM operating bandwidth of the frequency band. On the other hand, range 204 is typical of what an LTE operating bandwidth would look like. As can be seen, the signal strengths of the frequencies within the LTE operating bandwidth are substantially uniform. In other words, the signal strengths are substantially the same within the LTE operating bandwidth of the frequency band.

As part of an aspect of this disclosure, the patterns exhibited by the two differing RATs within the common frequency band (in this example, GSM and LTE) may be used in order to identify the specific operating bandwidth(s) of each RAT. Once the specific operating bandwidth(s) of each RAT within a common frequency band is identified, the PLMN search time for a specific RAT may be improved by avoiding the frequencies associated with the undesired RAT.

For example, if a mobile terminal is attempting to synchronize to a GSM network and the GSM network is operating on a common frequency band with an LTE network, the mobile terminal may mistakenly attempt to synchronize with the LTE network. However, if the mobile terminal is able to distinguish between the GSM operating bandwidth(s) and the LTE operating bandwidth(s) within the common frequency band, then the mobile terminal may avoid, or exclude, the LTE operating bandwidth(s) for cell synchronization, i.e. system information block (SIB) acquisition. Applying FIG. 2, if attempting to synchronize with a GSM network, the mobile terminal may avoid the 204 frequency range, i.e. the frequency range associated with the LTE bandwidth, in the PLMN search. By implementing such a method, the mobile terminal may significantly improve the PLMN search time for GSM synchronization. This method will be described more in detail in the disclosure that follows.

In FIG. 3A-3F, an exemplary aspect of this disclosure is shown. Once again, for purposes of this explanation and continuity, the common operating frequency band will be said to support both GSM and LTE bandwidths, but it should be appreciated that other RATs may be subject to this disclosure as well.

Figure 3A:
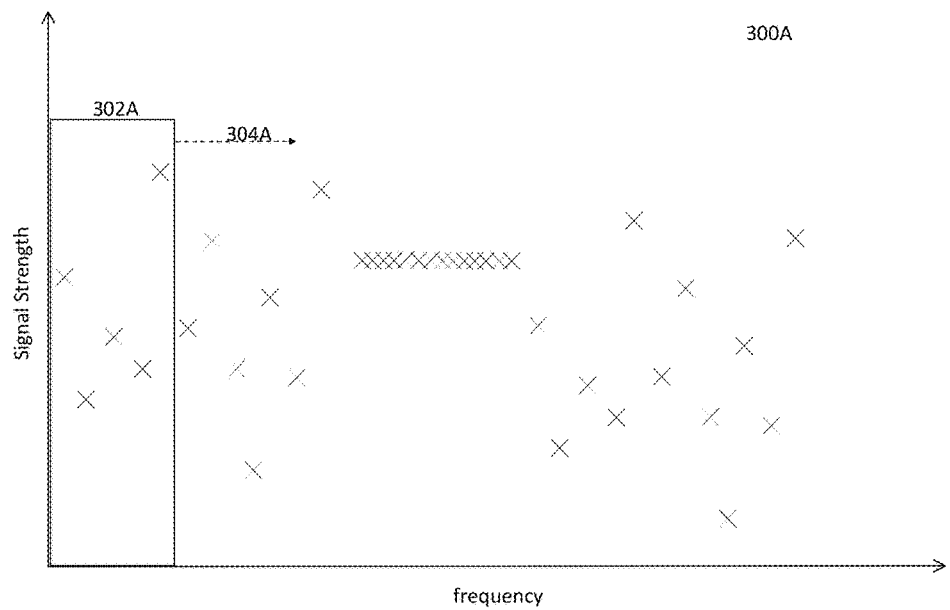
FIG. 3A-3F shows a series of frequency vs. signal strength graphs with an exemplary frequency window in an aspect of this disclosure.
Figure 3B:
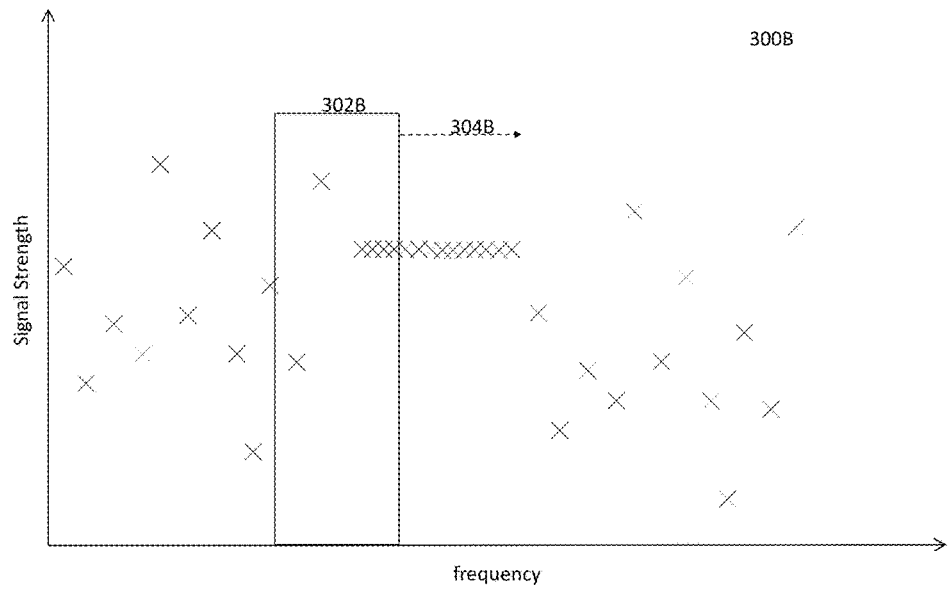

In FIG. 3A, a graph 300A of signal strengths and frequencies similar to the one in FIG. 2 is shown. A frequency window 302A is also shown.

Once the frequency band has been scanned and the signal strength data has been collected, the mobile terminal performs an analysis of the data. The analysis may comprise of selecting a set of data, here shown to fall within the frequency window 302A, and determining the standard deviation of the signal strengths of the frequencies within the frequency window 302A. The calculated standard deviation is then compared to a predetermined threshold value.

The frequency window 302A is selected in order to provide an accurate analysis of the data. For example, if applied to a common frequency band with frequency allocation for both GSM and LTE, a selected frequency window of ten units (e.g. MHz) may be sufficient in order to distinguish between the GSM and LTE operating bandwidths in an efficient manner. In other scenarios, the selected frequency window may be in KHz or GHz units.

The threshold value may be selected in order to distinguish/differentiate between separate RAT operating bandwidths on a common frequency band by identifying the non-uniform signal strength RAT versus uniform signal strength RAT operating bandwidths. As previously discussed, in this manner, the GSM operating bandwidth (exhibiting substantially non-uniform signal strengths) may be distinguished from the LTE operating bandwidth (exhibiting substantially uniform signal strengths). However, other RATs may be subject to a similar analysis, such as, for example, distinguishing between GSM (substantially non-uniform) and UMTS (substantially uniform) operating bandwidths on a common frequency band. In other words, the disclosure herein described provides a device and method of distinguishing between RATs when there is a sufficient difference in the uniformity of signal strengths between the two (or more) RATs. Accordingly, the threshold value is chosen in order to differentiate between the two (or more) RATs. For example, the threshold value may be any value between 1-5, specifically, for example, the threshold value may be 2.

By comparing the standard deviation of a set of frequencies of the frequency band to the predetermined threshold value, a RAT with substantially uniform signal strengths across the frequencies of its operating bandwidth can be differentiated from a RAT with substantially non-uniform signal strengths across the frequencies of its operating bandwidth. In FIG. 3A, the standard deviation of the data within window 302A is calculated and compared to the threshold value. Here, the value of the standard deviation of the data within window 302A is greater than that of the predetermined threshold value. Therefore, the frequencies within window 302A are in the GSM operating bandwidth since GSM is a RAT with substantially non-uniform signal strengths across its operating bandwidth. Therefore, the data within window 302A will be marked for performing GSM synchronization at a later point.

The window is then be moved, as indicated by arrow 304A to analyze a next set of frequencies. The window may be a "sliding" window, i.e. the analysis is continuously being performed for the data within the window as it "slides" to the right, or the window may be designated to "jump" to the right, i.e. the window moves to the right in incremental steps, such as, for example, five unit (e.g. MHz, KHz, or GHz) increments. Other increment values may be selected.

Figure 3C:
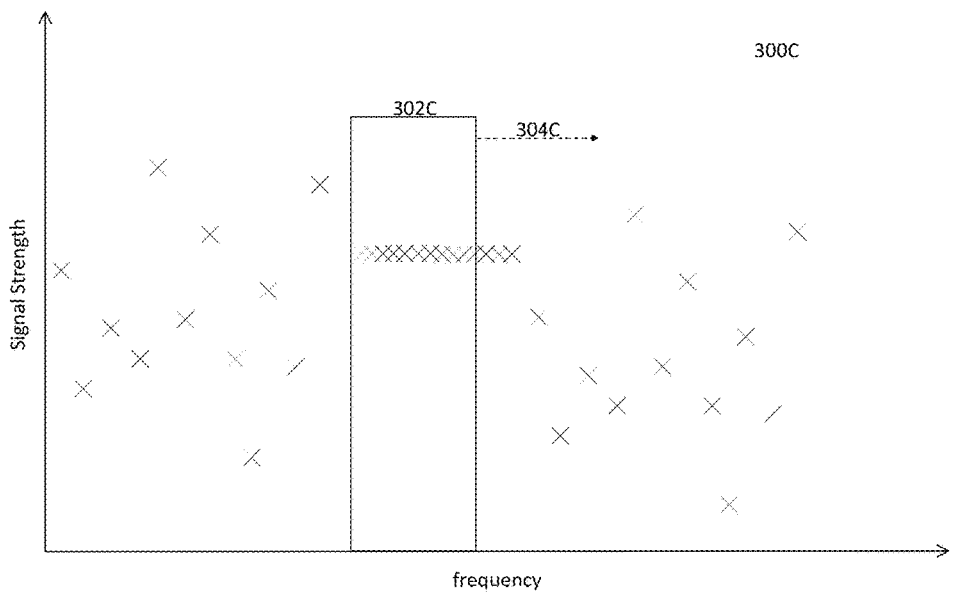
Figure 3D:
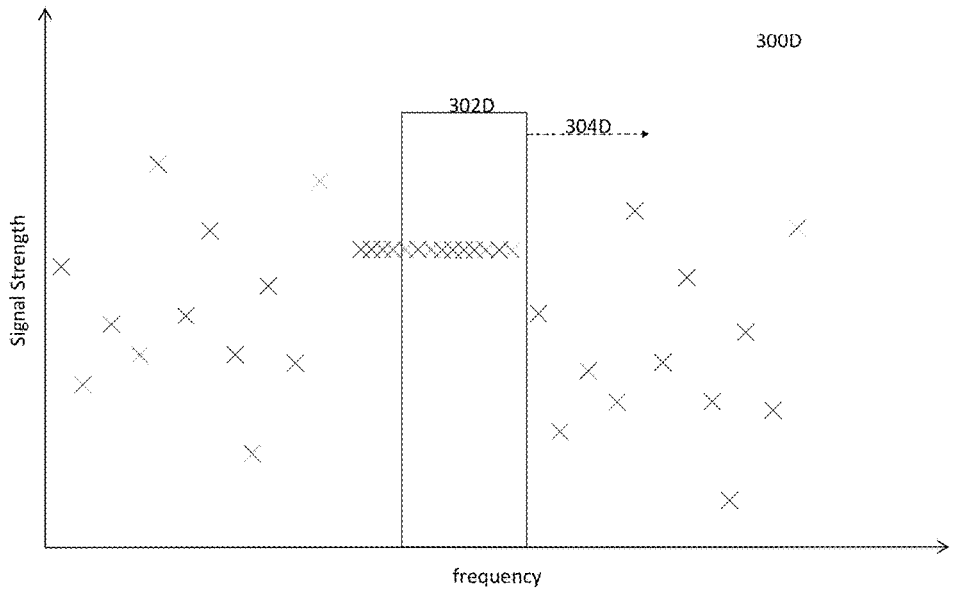
Figure 3E:
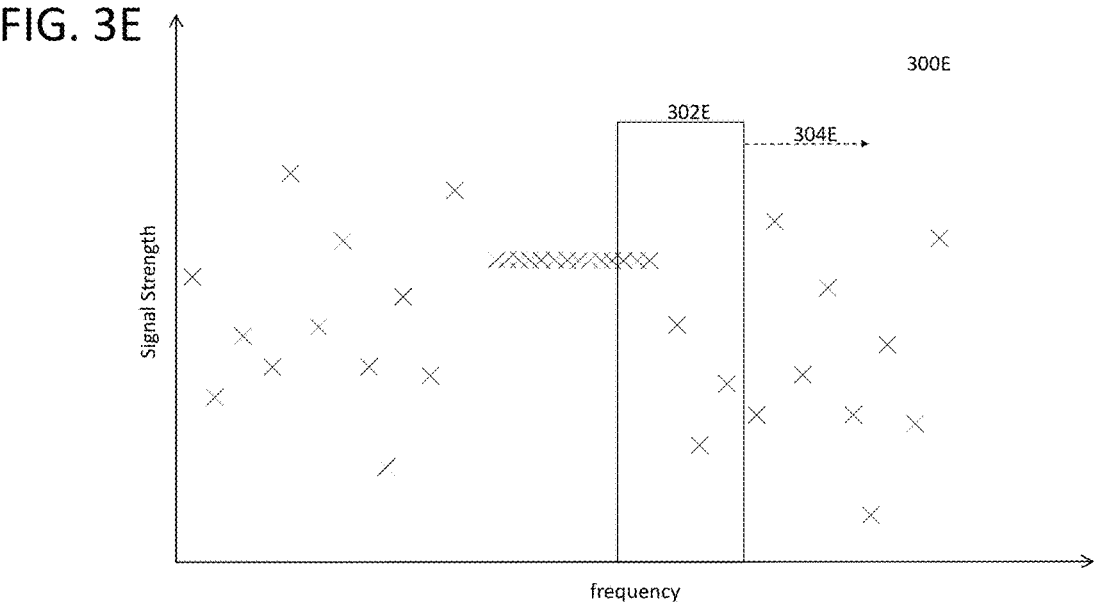
Figure 3F:
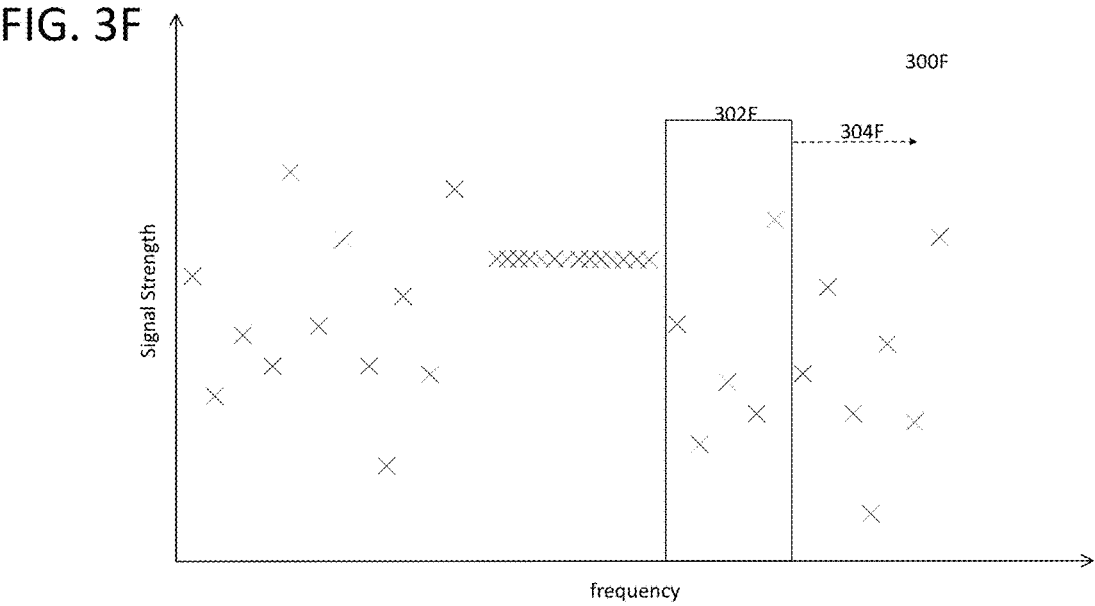

FIG. 3B-3F show the window (302B-302F, respectively, in FIG. 3B-3F) as it moves to other sets of frequencies of the frequency band. In each illustration, the standard deviation of the data set within the window is calculated and compared to the threshold value. In FIG. 3C and FIG. 3D, all the data points within the frequency window 304C and 304D, respectively, have substantially the same signal strength. In these cases, the standard deviation of the data points within windows 304C and 304D will fall below the threshold value, which means that these frequencies pertain to the LTE operating bandwidth as LTE is a RAT with a substantially uniform signal strength across the frequencies of its operating bandwidth. Accordingly, for GSM synchronization, these frequencies will be avoided, thereby improving PLMN search time.

The window and the starting frequency (in this case, $f_0$) for the frequency band are selected in way of the wireless system, e.g. 3GPP, specifications. In this manner, the likelihood of multiple RATs in a single window can be diminished. In the scenario where multiple RATs fall within the window, as is demonstrated in FIG. 3B and FIG. 3E, all the frequencies will be marked for synchronization for the searched for RAT, which in this example, is GSM. This will ensure that all the RAT (in this example, GSM) cell information is available to the UE for the cell search.

In other aspects of this disclosure, alternative methods for analyzing the data of the frequency band scan may be implemented. For example, instead of starting at the low-end of the frequency band as explained in FIG. 3A-3F, the analysis may start at the high end of the frequency range and move towards the low-end of the frequency band. In another example, the window may be moved in a more arbitrary manner, that is, the window may start at any point within the frequency band and move around the frequency band until all the frequencies of the frequency band have been analyzed.

In another exemplary aspect of this disclosure, a device may employ a similar method in order to synchronize with an LTE network. However, instead of marking the frequency ranges with non-uniform signal strengths (e.g. GSM) for later synchronization and avoiding the frequency ranges with uniform signal strengths (i.e. LTE) as described in FIG. 3A-3F, the opposite is done: the frequency ranges with uniform signal strengths are marked for later synchronization and the frequency ranges with non-uniform signal strengths (e.g. GSM) are avoided. In this manner, the PLMN search time for LTE synchronization may be reduced.

Figure 4:
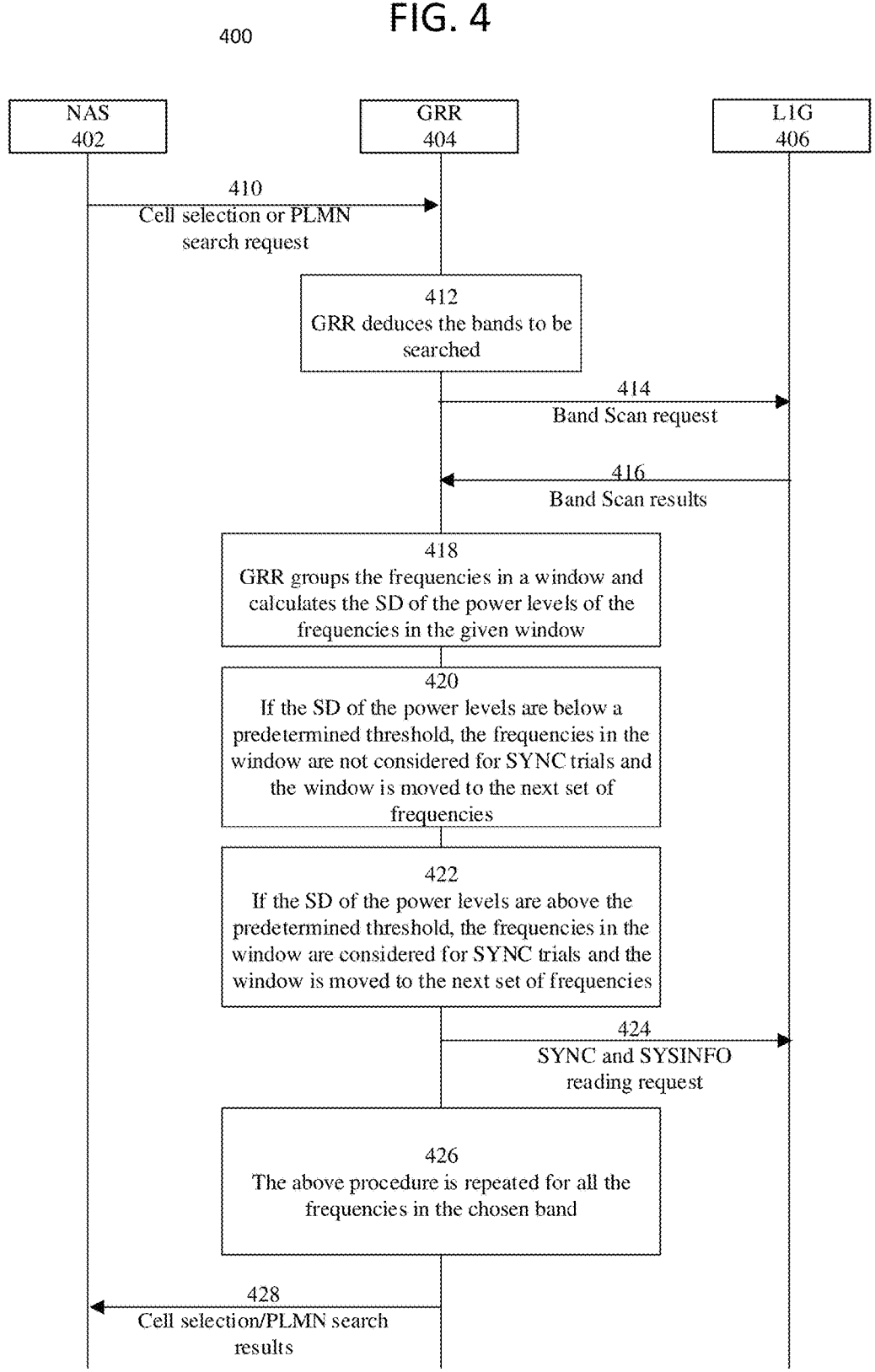
FIG. 4 shows an example of a message sequence chart (MSC) in an aspect of this disclosure.

FIG. 4 shows an exemplary message sequence chart (MSC) 400 of an aspect of this disclosure as it relates to searching for and synchronizing with a GSM network in a GSM and LTE common frequency band.

The non-access stratum (NAS) 402, the general packet radio service radio resource (GRR) 404, and the layer 1 of the GSM (L1G) 406 are all components of the protocol stack (software and/or firmware control modules) in the baseband modem of a mobile terminal.

Upon entering a cell, the NAS will send a cell selection or PLMN search request 410 to the GRR. After receiving this request, the GRR will deduce the band(s) to be searched 412. For example, looking back at FIG. 2, the band to be searched will be from $f_0$ and $f_n$. The GRR will then send the band scan request 414 to the L1G. The L1G will perform the scan and send the band scan results 416 back to the GRR. Upon receiving the band scan results, the GRR will start the analysis of the band scan results 418, wherein the standard deviation (SD) of power levels (i.e. the signal strength) within a given window (as described in FIG. 3A-3F) is calculated.

If the SD falls below a predetermined threshold, the frequencies in the window are not considered for GSM synchronization and the window moves to the next set of frequencies 420. The frequencies in the window are not considered for GSM synchronization because since the SD falls below the predetermined threshold, the frequencies in the window are of substantially uniform signal strength, meaning that the frequencies are a part of the LTE operating bandwidth.

If the SD of the power levels are above the predetermined threshold, the frequencies in the window are considered for GSM synchronization and the window moves to the next set of frequencies 422. The frequencies in the window are considered for GSM synchronization because since the SD falls above the predetermined threshold, the frequencies in the window are of substantially non-uniform signal strength, meaning that the frequencies are part of the GSM operating bandwidth.

Once either 420 or 422 has occurred (depending on whether the SD was above or below the predetermined threshold value), the GRR sends the SYNC and SYSINFO reading request 424 to the L1G. Then, the sequence of 418-424 is repeated for other frequency windows until all the frequencies in the chosen band have been analyzed 426.

In another implementation, 424 and 426 may be switched so that the procedure of 418-422 is repeated for all of the frequencies in the chosen band, and then the SYNC and SYSINFO reading request is sent. Once the entire frequency band has been analyzed, the GRR sends the cell selection/PLMN search results 428 to the NAS.

In this example, the mobile terminal is attempting to synchronize with a GSM network. However, a similar MSC may be employed in order for a mobile terminal to connect to a RAT which shares a common frequency band with at least another RAT and the at least two RATs can be distinguished by the uniformity of the signal strength across their respective operating bandwidth(s). For example, in the case of synchronizing with an LTE network in a GSM and LTE common frequency band, instead of the L1G performing the band scan, the L1E, or the layer 1 of the LTE, will perform the band scan. Then, instead of considering the frequencies with an SD above the threshold value for synchronization and discarding the frequencies with a SD below the threshold value, the GRR will consider the frequencies with an SD below the threshold value for synchronization and discard the frequencies with a SD above the threshold value. This is because the mobile terminal is attempting to synchronize with an LTE network, which exhibits the characteristic of substantially uniform signal strengths across the frequencies of its operating bandwidth.

Figure 5:
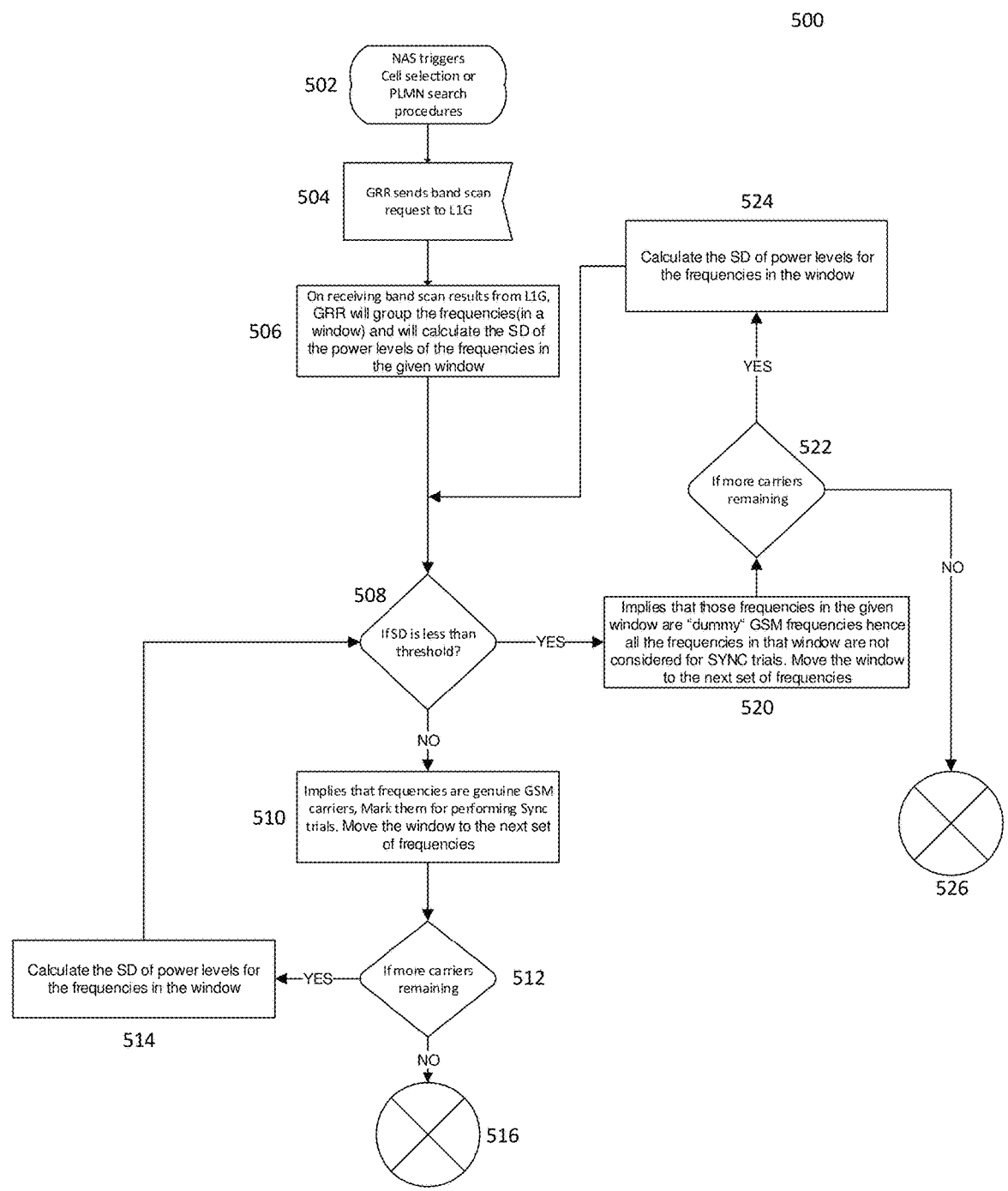
FIG. 5 shows a high-level block diagram in an aspect of this disclosure.

FIG. 5 is a high-level flowchart 500 of an aspect of this disclosure. In this example, the mobile terminal is performing a search in order to synchronize to a GSM network.

In 502, the NAS triggers the cell selection or PLMN search procedures. The GRR then sends the band scan request to the L1G 504. On receiving the band scan results from the L1G, the GRR will group the frequencies in a window and calculate the SD of the power levels (i.e. signal strength) of the frequencies in the given window 506. Then, the standard deviation of the power levels of the frequencies in the given window is compared to a predetermined threshold value 508.

If the SD deviation is greater than the threshold, it implies that the frequencies within the window are genuine GSM carriers and the frequencies are marked for synchronization (SYNC) 510. The window then moves to the next set of frequencies. If there are more carriers (i.e. frequencies within the frequency band) remaining, the SD of the power levels for other sets of frequencies in the frequency band are calculated 514 and compared to the threshold value 508. If there are no more carriers remaining, the process is terminated 516.

If the SD deviation is less than the threshold, it implies that the frequencies within the window are not of the GSM operating bandwidth, and those frequencies are not considered for synchronization 520. If there are more carriers (i.e. frequencies within the frequency band) remaining, the SD of the power levels for other sets of frequencies is calculated 524 and compared to the threshold value 508. If there are no more carriers remaining, the process is terminated 526.

A similar high-level flowchart may show how the mobile terminal searches in order to connect to another RAT, for example, an LTE network when operating in a common frequency band as a GSM network. In that case, the flowchart will differ in that the windows with a SD lower than the threshold value will be marked for synchronization and the windows with a SD higher than the threshold value will not be considered for synchronization.

Figure 6:
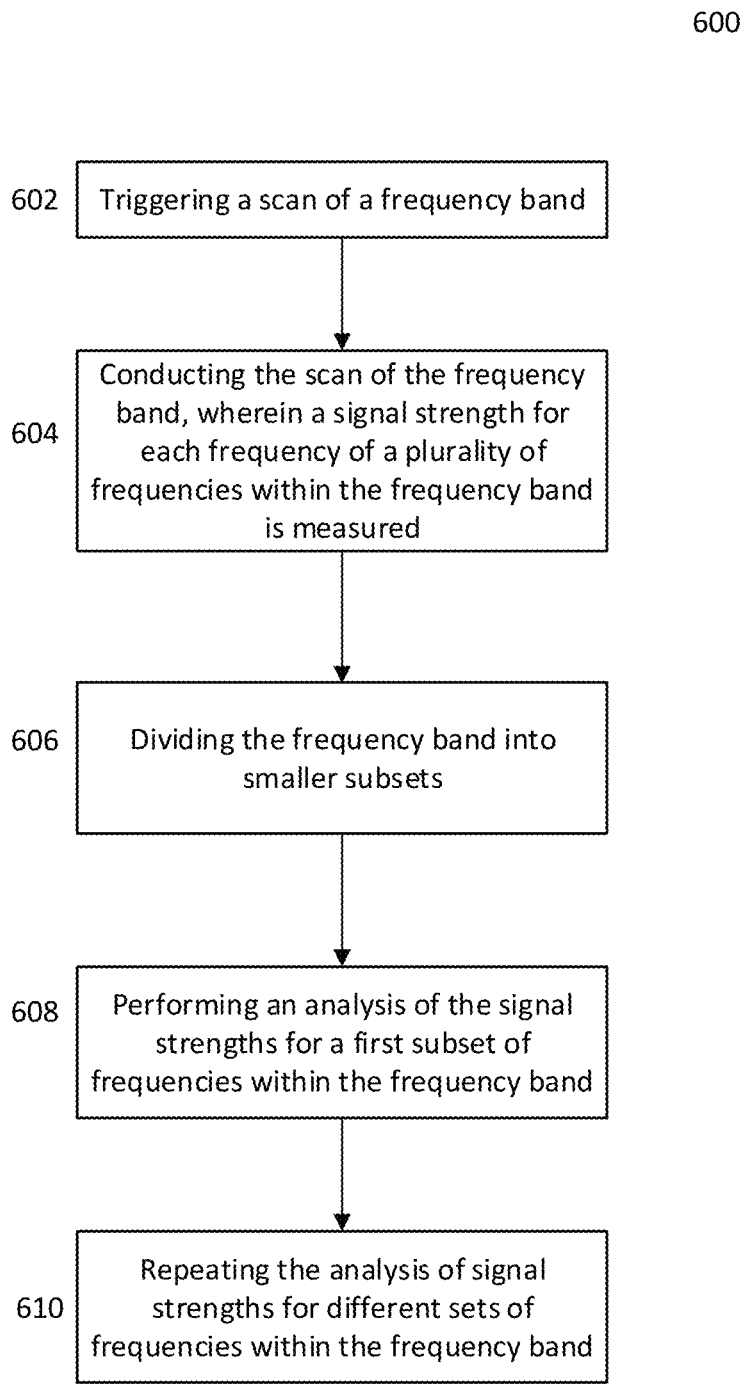
FIG. 6 shows a block diagram in an aspect of this disclosure.

FIG. 6 shows a block diagram 600 in an aspect of this disclosure.

The frequency band scan is triggered in 602. Then, the band scan of the frequency band is conducted, wherein a signal strength for each carrier (i.e. frequency) of a plurality of frequencies within the frequency band is measured. The frequency band may then be divided into a smaller subsets in 606, or the baseband modem may be configured to begin the proceeding analysis and divide the frequency band into subsets as it conducts the analysis, e.g. by use of a sliding window. An analysis of the signal strengths for a first subset of frequencies with the frequency band is performed 608. The analysis may consist of calculating the mean and standard deviation of the signal strengths for the first set of frequencies and comparing the standard deviation to a predetermined threshold value. Depending on what RAT synchronization is desired (which is based on the uniformity of the signal strengths of the RAT), the set of frequencies will either be marked for synchronization or avoided in synchronization trials. The analysis is then repeated for other sets of frequencies within the frequency band 610.

In Example 1, a mobile device for searching a frequency band for a RAT, the mobile device having a radio frequency unit and a baseband modem configured to conduct a scan of a frequency band, wherein a signal strength for each frequency of a plurality of frequencies within the frequency band is measured, divide the frequency band into a plurality of subsets of frequencies, and perform an analysis of signal strengths for the plurality of subsets of frequencies.

In Example 2, the subject matter of Example 1 may optionally include that the analysis of signal strengths comprises calculating a standard deviation of the signal strengths for each subset of frequencies and comparing the standard deviation to a threshold value.

In Example 3, the subject matter of Example 2 may optionally include that the threshold value is a value chosen in order to differentiate between a RAT with a substantially uniform signal strength across its frequency spectrum and a different RAT with a substantially non-uniform signal strength across its frequency spectrum.

In Example 4, the subject matter of any one of the preceding examples may include that the analysis of signal strengths for the plurality of subsets of frequencies is repeated until the entire frequency band has been analyzed.

In Example 5, the subject matter of any one of the preceding examples may include that all of the subsets of frequencies have a same sized frequency window.

In Example 6, the subject matter of Example 5 may include that the same sized frequency window spans ten units of the frequency band.

In Example 7, the subject matter of Example 5 may include that the same sized frequency window spans any one of three to nine units of the frequency band.

In Example 8, the subject matter of Example 5 may include that the same sized frequency window spans any one of eleven to twenty units of the frequency band.

In Example 9, the subject matter of any one of the Examples 5-8 may include that the units to be used in the frequency window are in megahertz (MHz). Also, the units may be in kilohertz (KHz) or in gigahertz (GHz).

In Example 10, the subject matter of any one of the preceding examples may include that the first subset of frequencies analyzed is at the lowest end of the frequency band.

In Example 11, the subject matter of Example 10 may include that the analysis is repeated over different subsets of frequencies by moving the frequency window towards the high end of the frequency band.

In Example 12, the subject matter of any one of the Examples 1-9 may include that the first subset of frequencies analyzed is at the highest end of the frequency band.

In Example 13, the subject matter of Example 12 may include that the analysis is repeated over different subsets of frequencies by moving the frequency window towards the low end of the frequency band.

In Example 14, the subject matter of any one of the preceding examples may include that if the standard deviation of the signal strengths for a given subset of frequencies is lower than the threshold value, the given subset of frequencies is not considered for RAT synchronization trials.

In Example 15, the subject matter of Example 14 may include that if the standard deviation of the signal strengths for the given subset of frequencies is higher than the threshold value, the given subset of frequencies is considered for RAT synchronization trials.

In Example 16, the subject matter of Example Error! Reference source not found. may include that the RAT synchronization trials are performed in order to connect to a Global System for Mobile Communications (GSM) network.

In Example 17, the subject matter of Example 16 may include that the frequency band of the GSM network is shared with that of the long-term evolution (LTE) network.

In Example 18, the subject matter of any one of the preceding examples may include that the subsets of frequencies operating on an LTE network exhibit a standard deviation lower than that of the threshold value.

In Example 19, the subject matter of any one of Examples 1-13 may include that if the standard deviation of the signal strengths for a given subset of frequencies is higher than the threshold value, the given subset of frequencies is not considered for synchronization trials.

In Example 20, the subject matter of Example 19 may include that if the standard deviation of the signal strengths for a given subset of frequencies is lower than the threshold value, the given subset of frequencies is considered for synchronization trials.

In Example 21, the subject matter of Example 20 may include that the RAT synchronization trials are performed in order to connect to a Long-Term Evolution (LTE) network.

In Example 22, the subject matter of Example 21 may include that the frequency band of the LTE network is shared with that of the Global System for Mobile Communications (GSM) network.

In Example 23, the subject matter of Example 22 may include that the subsets of frequencies operating on the GSM network exhibit a standard deviation higher than that of the threshold value.

In Example 24, the subject matter of any one of the preceding examples may include that the mobile device further has an application processor.

In Example 25, the subject matter of any one of the preceding examples may further include that the scan of the frequency band is initiated by a cell selection search request or a public land mobile network search request.

In Example 26, the subject matter of Example 25 may further include that the cell selection search request or the public land mobile network search request is made by the non-access stratum protocol.

In Example 27, the subject matter of Example 26 may include that the non-access stratum protocol sends the cell selection search request or the public land mobile network search request to the general packet radio service radio resource management (GRR).

In Example 28, the subject matter of Example 27 may further include that the GRR deduces the frequency band to be searched and is the component of the baseband modem that triggers the scan of the frequency band.

In Example 29, the subject matter of Example 28 may further include that the layer 1 element of the Global System for Mobile Communications (GSM) network (L1G) is the component of the baseband modem that conducts the scan of the frequency band.

In Example 30, the subject matter of Example 29 may further include that the GRR performs the analysis of the signal strengths.

In Example 31, the subject matter of any one of the preceding examples may further include that the baseband modem is further configured to synchronize the mobile device with a RAT. The RAT with which the mobile device synchronizes to may be based on the results of the analysis performed by the baseband modem.

In Example 32, a method to search a frequency band for a radio access technology (RAT), the method comprising conducting a scan of the frequency band, wherein a signal strength for each frequency of a plurality of frequencies within the frequency band is measured, dividing the frequency band into a plurality of subsets of frequencies, and performing an analysis of signal strengths for the plurality of subsets of frequencies.

In Example 33, the subject matter of Example 32 may further include that the analysis of signal strengths comprises calculating a standard deviation of the signal strengths for each subset of frequencies and comparing the standard deviation to a threshold value.

In Example 34, the subject matter of Example 33 may include that the threshold value is a value chosen in order to differentiate between a RAT with a substantially uniform signal strength across its frequency spectrum and a different RAT with a substantially non-uniform signal strength across its frequency spectrum.

In Example 35, the subject matter of any one Examples 32-34 may include that the analysis of signal strengths for the plurality of subsets of frequencies is repeated until the entire frequency band has been analyzed.

In Example 36, the subject matter of any one Examples 32-35 may include that all of the subsets of frequencies have a same sized frequency window.

In Example 37, the subject matter of Example 36 may include that the same sized frequency window spans ten units of the frequency band.

In Example 38, the subject matter of Example 36 may include that the same sized frequency window spans any one of three to nine units of the frequency band.

In Example 39, the subject matter of Example 36 may include that the same sized frequency window spans any one of eleven to twenty units of the frequency band.

In Example 40, the subject matter of Examples 37-39 may include that the units to be used in the frequency window are in megahertz (MHz). Also, the units may be in kilohertz (KHz) or in gigahertz (GHz).

In Example 41, the subject matter of any one Examples 32-40 may include that the first subset of frequencies analyzed is at the lowest end of the frequency band.

In Example 42, the subject matter of Example 41 may include that the analysis is repeated over different subsets of frequencies by moving the frequency window towards the high end of the frequency band.

In Example 43, the subject matter of any one of Examples 32-40 may include that the first subset of frequencies analyzed is at the highest end of the frequency band.

In Example 44, the subject matter of Example 43 may include that the analysis is repeated over different subsets of frequencies by moving the frequency window towards the low end of the frequency band.

In Example 45, the subject matter of any one Examples 32-44 may include that if the standard deviation of the signal strengths for a given subset of frequencies is lower than the threshold value, the given subset of frequencies is not considered for RAT synchronization trials.

In Example 46, the subject matter of Example 45 may include that if the standard deviation of the signal strengths for the given subset of frequencies is higher than the threshold value, the given subset of frequencies is considered for RAT synchronization trials.

In Example 47, the subject matter of Example 46 may include that the RAT synchronization trials are performed in order to connect to a Global System for Mobile Communications (GSM) network.

In Example 48, the subject matter of Example 47 may include that the frequency band of the GSM network is shared with that of the long-term evolution (LTE) network.

In Example 49, the subject matter of any one Examples 32-48 may include that the subsets of frequencies operating on an LTE network exhibit a standard deviation lower than that of the threshold value.

In Example 50, the subject matter of any one of Examples 32-44 may include that if the standard deviation of the signal strengths for a given subset of frequencies is higher than the threshold value, the given subset of frequencies is not considered for synchronization trials.

In Example 51, the subject matter of Example 50 may include that if the standard deviation of the signal strengths for a given subset of frequencies is lower than the threshold value, the given subset of frequencies is considered for synchronization trials.

In Example 52, the subject matter of Example 51 may include that the RAT synchronization trials are performed in order to connect to a Long-Term Evolution (LTE) network.

In Example 53, the subject matter of Example 52 may include that the frequency band of the LTE network is shared with that of the Global System for Mobile Communications (GSM) network.

In Example 54, the subject matter of Example 53 may include that the subsets of frequencies operating on the GSM network exhibit a standard deviation higher than that of the threshold value.

In Example 55, the subject matter of any one Examples 32-54 may further include that the scan of the frequency band is initiated by a cell selection search request or a public land mobile network search request.

In Example 56, the subject matter of Example 55 may further include that the cell selection search request or the public land mobile network search request is made by the non-access stratum protocol.

In Example 57, the subject matter of Example 56 may include that the non-access stratum protocol sends the cell selection search request or the public land mobile network search request to the general packet radio service radio resource management (GRR).

In Example 58, the subject matter of Example 57 may further include that the GRR deduces the frequency band to be searched and is the component of the baseband modem that triggers the scan of the frequency band.

In Example 59, the subject matter of Example 58 may further include that the layer 1 element of the Global System for Mobile Communications (GSM) network (L1G) is the component of the baseband modem that conducts the scan of the frequency band.

In Example 60, the subject matter of Example 59 may further include that the GRR performs the analysis of the signal strengths.

In Example 61, the subject matter of any one Examples 32-60 may further include synchronizing with a RAT.

In Example 62, a non-transitory computer readable medium with computer readable instructions to cause a mobile device to execute a frequency band search for a radio access technology (RAT), comprising conducting a scan of the frequency band, wherein a signal strength for each frequency of a plurality of frequencies within the frequency band is measured, dividing the frequency band into a plurality of subsets of frequencies, and performing an analysis of signal strengths for each of the plurality of subsets of frequencies.

In Example 63, the subject matter of Example 62 can include that the analysis of signal strengths comprises calculating a standard deviation of the signal strengths for each subset of frequencies and comparing the standard deviation to a threshold value.

In Example 64, the subject matter of Example 63 can include that the threshold value is a value chosen in order to differentiate between a RAT with a substantially uniform signal strength across its frequency spectrum and a different RAT with a substantially non-uniform signal strength across its frequency spectrum.

In Example 65, the subject matter of any one of Example 62-64 can include that the analysis of signal strengths for the plurality of subsets of frequencies is repeated until the entire frequency band has been analyzed.

In Example 66, the subject matter of any one of Examples 62-65 can include that all of the subsets of frequencies have a same sized frequency window.

In Example 67, the subject matter of Example 66 can include that the same sized frequency window spans ten units of the frequency band.

In Example 68, the subject matter of Example 66 can include that the same sized frequency window spans any one of three to nine units of the frequency band.

In Example 69, the subject matter of Example 66 can include that the same sized frequency window spans any one of eleven to twenty units of the frequency band.

In Example 70, the subject matter of any one of Example 66-69 can include that the units to be used in the frequency window are in megahertz (MHz). Also, the units may be in kilohertz (KHz) or in gigahertz (GHz).

In Example 71, the subject matter of any one of Examples 62-70 can include that the first subset of frequencies analyzed is at the lowest end of the frequency band.

In Example 72, the subject matter of Example 71 can include that the analysis is repeated over different subsets of frequencies by moving the frequency window towards the high end of the frequency band.

In Example 73, the subject matter of any one of Examples 62-70 can include that the first subset of frequencies analyzed is at the highest end of the frequency band.

In Example 74, the subject matter of Example 73 can include that the analysis is repeated over different subsets of frequencies by moving the frequency window towards the low end of the frequency band.

In Example 75, the subject matter of any one of Examples 62-74 can include that if the standard deviation of the signal strengths for a given subset of frequencies is lower than the threshold value, the given subset of frequencies is not considered for RAT synchronization trials.

In Example 76, the subject matter of Example 75 can include that if the standard deviation of the signal strengths for the given subset of frequencies is higher than the threshold value, the given subset of frequencies is considered for RAT synchronization trials.

In Example 77, the subject matter of Example 76 can include that the RAT synchronization trials are performed in order to connect to a Global System for Mobile Communications (GSM) network.

In Example 78, the subject matter of Example 77 can include that the frequency band of the GSM network is shared with that of the long-term evolution (LTE) network.

In Example 79, the subject matter of any one of Examples 62-78 can include that the subsets of frequencies operating on an LTE network exhibit a standard deviation lower than that of the threshold value.

In Example 80, the subject matter of any one of Examples 62-74 can include that if the standard deviation of the signal strengths for a given subset of frequencies is higher than the threshold value, the given subset of frequencies is not considered for synchronization trials.

In Example 81, the subject matter of Example 80 can include that if the standard deviation of the signal strengths for a given subset of frequencies is lower than the threshold value, the given subset of frequencies is considered for synchronization trials.

In Example 82, the subject matter of Example 81 can include that the RAT synchronization trials are performed in order to connect to a Long-Term Evolution (LTE) network.

In Example 83, the subject matter of Example 82 can include that the frequency band of the LTE network is shared with that of the Global System for Mobile Communications (GSM) network.

In Example 84, the subject matter of Example 83 can include that the subsets of frequencies operating on the GSM network exhibit a standard deviation higher than that of the threshold value.

In Example 85, the subject matter of any one of Examples 62-84 may include that the scan of the frequency band is initiated by a cell selection search request or a public land mobile network search request.

In Example 86, the subject matter of Example 85 may include that the cell selection search request or the public land mobile network search request is made by a non-access stratum protocol.

In Example 87, the subject matter of Example 86 may include that wherein the non-access stratum protocol sends the cell selection search request or the public land mobile network search request to the general packet radio service radio resource management (GRR).

In Example 88, the subject matter of Example 87 may further include that the GRR deduces the frequency band to be searched and is the component of the baseband modem that triggers the scan of the frequency band.

In Example 89, the subject matter of Example 88 may further include that the layer 1 element of the Global System for Mobile Communications (GSM) network (L1G) is the component of the baseband modem that conducts the scan of the frequency band.

In Example 90, the subject matter of Example 89 may further include that the GRR performs the analysis of the signal strengths.

In Example 91, the subject matter of any one Examples 62-90 may further include synchronizing with a RAT.

In Example 92, the subject matter of any one of Examples 62-91 may further include that the non-transitory computer readable medium is stored in a memory component of a mobile device.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A mobile device for searching a frequency band for a radio access technology (RAT), the mobile device comprising:
    a radio frequency unit; and
    a baseband modem configured to:
        conduct a scan of the frequency band, wherein a signal strength for each frequency of a plurality of frequencies within the frequency band is measured;
        divide the frequency band into a plurality of subsets of frequencies;
        perform an analysis of signal strengths for the plurality of subsets of frequencies, wherein the analysis of signal strengths comprises determining a deviation of the signal strengths in each of the plurality of subsets of frequencies; and
        identify a range of frequencies corresponding to the RAT based on the analysis of signal strengths.

2. The mobile device of claim 1, wherein the analysis of signal strengths comprises calculating a standard deviation of the signal strengths for each subset of frequencies and comparing the standard deviation to a threshold value.

3. The mobile device of claim 2, wherein the threshold value is configured to differentiate between a RAT with a substantially uniform signal strength across its frequency spectrum and a different RAT with a substantially non-uniform signal strength across its frequency spectrum.

4. The mobile device of claim 1, wherein all of the subsets of frequencies have a same sized frequency window.

5. The mobile device of claim 1, wherein the first subset of frequencies analyzed is at the lowest end of the frequency band.

6. The mobile device of claim 5, wherein the analysis is repeated over different subsets of frequencies by moving the frequency window towards the high end of the frequency band.

7. The mobile device of claim 1, wherein the first subset of frequencies analyzed is at the highest end of the frequency band.

8. The mobile device of claim 7, wherein the analysis is repeated over different subsets of frequencies by moving the frequency window towards the low end of the frequency band.

9. The mobile device of claim 2, wherein if the standard deviation of the signal strengths for a given subset of frequencies is lower than the threshold value, the given subset of frequencies is not considered for RAT synchronization trials.

10. The mobile device of claim 9, wherein if the standard deviation of the signal strengths for the given subset of frequencies is higher than the threshold value, the given subset of frequencies is considered for RAT synchronization trials.

11. The mobile device of claim 10, wherein the RAT synchronization trials are performed in order to connect to a Global System for Mobile Communications (GSM) network.

12. The mobile device of claim 2, wherein if the standard deviation of the signal strengths for a given subset of frequencies is higher than the threshold value, the given subset of frequencies is not considered for synchronization trials.

13. The mobile device of claim 12, wherein if the standard deviation of the signal strengths for a given subset of frequencies is lower than the threshold value, the given subset of frequencies is considered for synchronization trials.

14. The mobile device of claim 13, wherein the RAT synchronization trials are performed in order to connect to a Long-Term Evolution (LTE) network.

15. A method to search a frequency band for a radio access technology (RAT), comprising:
    conducting a scan of the frequency band, wherein a signal strength for each frequency of a plurality of frequencies within the frequency band is measured;
    dividing the frequency band into a plurality of subsets of frequencies;
    performing an analysis of signal strengths for the plurality of subsets of frequencies, wherein the analysis of signal strengths comprises determining a deviation of the signal strengths in each of the plurality of subsets of frequencies; and
    identifying a range of frequencies corresponding to the RAT based on the analysis of signal strengths.

16. The method of claim 15, wherein the analysis of signal strengths comprises calculating a standard deviation of the signal strengths for each subset of frequencies and comparing the standard deviation to a threshold value.

17. The method of claim 16, further comprising choosing the threshold value in order to differentiate between a RAT with a substantially uniform signal strength across its frequency spectrum and a different RAT with a substantially non-uniform signal strength across its frequency spectrum.

18. The method of claim 16, further comprising wherein if the standard deviation of the signal strengths for a given subset of frequencies is lower than the threshold value, the given subset of frequencies is not considered for RAT synchronization trials.

19. The method of claim 18, further comprising wherein if the standard deviation of the signal strengths for the given subset of frequencies is higher than the threshold value, the given subset of frequencies is considered for RAT synchronization trials.

20. The method of claim 16, further comprising wherein if the standard deviation of the signal strengths for a given subset of frequencies is higher than the threshold value, the given subset of frequencies is not considered for synchronization trials.

21. The method of claim 20, further comprising wherein if the standard deviation of the signal strengths for a given subset of frequencies is lower than the threshold value, the given subset of frequencies is considered for synchronization trials.

22. A non-transitory computer readable medium with computer readable instructions to cause a mobile device to execute a frequency band search for a radio access technology (RAT), comprising:
   conducting a scan of the frequency band, wherein a signal strength for each frequency of a plurality of frequencies within the frequency band is measured;
   dividing the frequency band into a plurality of subsets of frequencies;
   performing an analysis of signal strengths for each of the plurality of subsets of frequencies, wherein the analysis of signal strengths comprises determining a deviation of the signal strengths in each of the plurality of subsets of frequencies; and
   identifying a range of frequencies corresponding to the RAT based on the analysis of signal strengths.

23. The non-transitory computer readable medium of claim 22, wherein the analysis of signal strengths comprises calculating a standard deviation of the signal strengths for each subset of frequencies and comparing the standard deviation to a threshold value.

24. The non-transitory computer readable medium of claim 23, further comprising choosing the threshold value in order to differentiate between a RAT with a substantially uniform signal strength across its frequency spectrum and a different RAT with a substantially non-uniform signal strength across its frequency spectrum.

* * * * *